(12) United States Patent
Boyle et al.

(10) Patent No.: US 8,959,284 B1
(45) Date of Patent: Feb. 17, 2015

(54) DISK DRIVE STEERING WRITE DATA TO WRITE CACHE BASED ON WORKLOAD

(75) Inventors: William B. Boyle, Lake Forest, CA (US); Alan T. Meyer, Anaheim Hills, CA (US); Mei-Man L. Syu, Fremont, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 778 days.

(21) Appl. No.: 12/824,959

(22) Filed: Jun. 28, 2010

(51) Int. Cl.
*G06F 3/06* (2006.01)
*G06F 12/00* (2006.01)
*G06F 13/00* (2006.01)

(52) U.S. Cl.
USPC .......................................................... 711/113

(58) Field of Classification Search
USPC .......................................................... 711/113
See application file for complete search history.

(56) References Cited

U.S. PATENT DOCUMENTS

| | | | |
|---|---|---|---|
| 5,333,138 A | 7/1994 | Richards et al. | |
| 5,420,998 A * | 5/1995 | Horning | 711/113 |
| 5,457,786 A | 10/1995 | Roush | |
| 5,471,604 A | 11/1995 | Hasbun et al. | |
| 5,581,785 A | 12/1996 | Nakamura et al. | |
| 5,586,291 A | 12/1996 | Lasker et al. | |
| 5,636,355 A * | 6/1997 | Ramakrishnan et al. | 711/113 |
| 5,682,273 A | 10/1997 | Hetzler | |
| 5,905,901 A | 5/1999 | Klein | |
| 5,913,067 A | 6/1999 | Klein | |
| 5,954,820 A | 9/1999 | Hetzler | |
| 6,044,439 A | 3/2000 | Ballard et al. | |
| 6,115,200 A | 9/2000 | Allen et al. | |
| 6,236,527 B1 | 5/2001 | Uchiike et al. | |
| 6,275,949 B1 | 8/2001 | Watanabe | |
| 6,295,577 B1 | 9/2001 | Anderson et al. | |
| 6,408,357 B1 * | 6/2002 | Hanmann et al. | 711/113 |
| 6,429,990 B2 | 8/2002 | Serrano et al. | |
| 6,437,935 B1 | 8/2002 | Johnson et al. | |
| 6,614,616 B1 | 9/2003 | Michel et al. | |
| 6,661,591 B1 | 12/2003 | Rothberg | |
| 6,662,267 B2 | 12/2003 | Stewart | |
| 6,687,850 B1 | 2/2004 | Rothberg | |
| 6,725,397 B1 | 4/2004 | Emberty et al. | |
| 6,732,241 B2 | 5/2004 | Riedel | |
| 6,754,021 B2 | 6/2004 | Kisaka et al. | |
| 6,798,599 B2 | 9/2004 | Dykes et al. | |
| 6,807,630 B2 | 10/2004 | Lay et al. | |

(Continued)

OTHER PUBLICATIONS

U.S. Appl. No. 12/720,568, filed Mar. 9, 2010, 22 pages.

(Continued)

*Primary Examiner* — Sanjiv Shah
*Assistant Examiner* — Glenn Gossage

(57) ABSTRACT

A disk drive is disclosed comprising a non-volatile write cache and a head actuated over a disk. A plurality of write commands are received from a host, wherein each write command comprises write data. A workload for a non-cache area of the disk is determined, and when the workload for the non-cache area of the disk is less than a threshold independent of a workload for the write cache, substantially all of the write data is stored in the non-cache area of the disk. When the workload for the non-cache area of the disk is greater than the threshold independent of the workload for the write cache, a first percentage of the write data is stored in the non-volatile write cache and a second percentage of the write data is stored in the non-cache area of the disk, wherein the first percentage is proportional to the workload for the non-cache area of the disk.

26 Claims, 5 Drawing Sheets

(56) References Cited

U.S. PATENT DOCUMENTS

| | | | |
|---|---|---|---|
| 6,845,456 B1 | 1/2005 | Menezes et al. | |
| 6,856,556 B1 | 2/2005 | Hajeck | |
| 6,892,313 B1 | 5/2005 | Codilian et al. | |
| 6,909,574 B2 | 6/2005 | Aikawa et al. | |
| 6,928,518 B2 * | 8/2005 | Talagala | 711/135 |
| 6,968,450 B1 * | 11/2005 | Rothberg et al. | 713/1 |
| 7,003,620 B2 | 2/2006 | Avraham et al. | |
| 7,017,037 B2 | 3/2006 | Fortin et al. | |
| 7,028,174 B1 | 4/2006 | Atai-Azimi et al. | |
| 7,076,605 B1 * | 7/2006 | Son | 711/113 |
| 7,082,494 B1 | 7/2006 | Thelin et al. | |
| 7,107,444 B2 | 9/2006 | Fortin et al. | |
| 7,114,029 B1 * | 9/2006 | Thelin | 711/112 |
| 7,120,806 B1 | 10/2006 | Codilian et al. | |
| 7,126,857 B2 | 10/2006 | Hajeck | |
| 7,139,933 B2 | 11/2006 | Hsu et al. | |
| 7,142,385 B2 | 11/2006 | Shimotono et al. | |
| 7,206,948 B2 | 4/2007 | Brauer | |
| 7,231,198 B2 | 6/2007 | Loughran | |
| 7,254,721 B1 | 8/2007 | Tobias et al. | |
| 7,275,166 B2 | 9/2007 | Kaiju et al. | |
| 7,334,082 B2 | 2/2008 | Grover et al. | |
| 7,340,647 B2 | 3/2008 | Aasheim et al. | |
| 7,350,105 B2 | 3/2008 | Aasheim et al. | |
| 7,392,340 B1 * | 6/2008 | Dang et al. | 711/111 |
| 7,395,452 B2 | 7/2008 | Nicholson et al. | |
| 7,411,757 B2 | 8/2008 | Chu et al. | |
| 7,421,552 B2 | 9/2008 | Long | |
| 7,425,810 B2 | 9/2008 | Hobbet et al. | |
| 7,430,136 B2 | 9/2008 | Merry, Jr. et al. | |
| 7,447,807 B1 | 11/2008 | Merry et al. | |
| 7,461,202 B2 | 12/2008 | Forrer, Jr. et al. | |
| 7,468,854 B2 | 12/2008 | Yamashita et al. | |
| 7,472,222 B2 | 12/2008 | Auerbach et al. | |
| 7,477,477 B2 | 1/2009 | Maruchi et al. | |
| 7,483,234 B2 | 1/2009 | Shimozato | |
| 7,502,256 B2 | 3/2009 | Merry, Jr. et al. | |
| 7,509,441 B1 | 3/2009 | Merry et al. | |
| 7,509,471 B2 | 3/2009 | Gorobets | |
| 7,516,346 B2 | 4/2009 | Pinheiro et al. | |
| 7,552,347 B2 | 6/2009 | Schutte | |
| 7,596,643 B2 | 9/2009 | Merry, Jr. et al. | |
| 7,610,438 B2 | 10/2009 | Lee et al. | |
| 7,610,445 B1 | 10/2009 | Manus et al. | |
| 7,613,876 B2 | 11/2009 | Bruce et al. | |
| 7,620,773 B2 | 11/2009 | Nicholson et al. | |
| 7,644,231 B2 | 1/2010 | Recio et al. | |
| 7,647,513 B2 | 1/2010 | Tobias et al. | |
| 7,653,778 B2 | 1/2010 | Merry, Jr. et al. | |
| 7,685,337 B2 | 3/2010 | Merry, Jr. et al. | |
| 7,685,338 B2 | 3/2010 | Merry, Jr. et al. | |
| 7,685,360 B1 | 3/2010 | Brunnett et al. | |
| 7,685,374 B2 | 3/2010 | Diggs et al. | |
| 7,698,586 B2 | 4/2010 | Kim et al. | |
| 7,719,785 B2 | 5/2010 | Taniguchi et al. | |
| 7,733,712 B1 | 6/2010 | Walston et al. | |
| 7,752,491 B1 | 7/2010 | Liikanen et al. | |
| 7,765,373 B1 | 7/2010 | Merry et al. | |
| 7,774,556 B2 | 8/2010 | Karamcheti et al. | |
| 7,797,487 B2 | 9/2010 | Lubbers et al. | |
| 7,817,372 B2 | 10/2010 | Takahashi | |
| 7,835,104 B2 | 11/2010 | Yamashita et al. | |
| 7,890,696 B2 | 2/2011 | Lawson | |
| 7,898,855 B2 | 3/2011 | Merry, Jr. et al. | |
| 7,912,991 B1 | 3/2011 | Merry et al. | |
| 7,936,603 B2 | 5/2011 | Merry, Jr. et al. | |
| 7,962,792 B2 | 6/2011 | Diggs et al. | |
| 7,984,259 B1 | 7/2011 | English | |
| 8,060,707 B2 | 11/2011 | Fairhurst et al. | |
| 8,078,918 B2 | 12/2011 | Diggs et al. | |
| 8,090,899 B1 | 1/2012 | Syu | |
| 8,095,851 B2 | 1/2012 | Diggs et al. | |
| 8,098,451 B2 | 1/2012 | Graef | |
| 8,108,692 B1 | 1/2012 | Merry et al. | |
| 8,122,185 B2 | 2/2012 | Merry, Jr. et al. | |
| 8,127,048 B1 | 2/2012 | Merry et al. | |
| 8,135,903 B1 | 3/2012 | Kan | |
| 8,139,307 B2 | 3/2012 | Kim et al. | |
| 8,151,020 B2 | 4/2012 | Merry, Jr. et al. | |
| 8,161,227 B1 | 4/2012 | Diggs et al. | |
| 8,166,245 B2 | 4/2012 | Diggs et al. | |
| 8,169,726 B2 | 5/2012 | Wilson | |
| 8,243,525 B1 | 8/2012 | Kan | |
| 8,244,975 B2 | 8/2012 | DeCenzo | |
| 8,245,003 B2 | 8/2012 | Suzuki et al. | |
| 8,254,172 B1 | 8/2012 | Kan | |
| 8,261,012 B2 | 9/2012 | Kan | |
| 8,286,018 B2 | 10/2012 | Chang et al. | |
| 8,296,625 B2 | 10/2012 | Diggs et al. | |
| 8,312,207 B2 | 11/2012 | Merry, Jr. et al. | |
| 8,316,176 B1 | 11/2012 | Phan et al. | |
| 8,341,339 B1 | 12/2012 | Boyle et al. | |
| 8,375,151 B1 | 2/2013 | Kan | |
| 8,392,635 B2 | 3/2013 | Booth et al. | |
| 8,397,107 B1 | 3/2013 | Syu et al. | |
| 8,407,449 B1 | 3/2013 | Colon et al. | |
| 8,423,722 B1 | 4/2013 | Deforest et al. | |
| 8,433,858 B1 | 4/2013 | Diggs et al. | |
| 8,443,167 B1 | 5/2013 | Fallone et al. | |
| 8,447,920 B1 | 5/2013 | Syu | |
| 8,458,435 B1 | 6/2013 | Rainey, III et al. | |
| 8,478,930 B1 | 7/2013 | Syu | |
| 8,489,854 B1 | 7/2013 | Colon et al. | |
| 8,503,237 B1 | 8/2013 | Horn | |
| 8,521,972 B1 | 8/2013 | Boyle et al. | |
| 8,549,236 B2 | 10/2013 | Diggs et al. | |
| 8,583,835 B1 | 11/2013 | Kan | |
| 8,601,311 B2 | 12/2013 | Horn | |
| 8,601,313 B1 | 12/2013 | Horn | |
| 8,612,644 B2 | 12/2013 | Kumasawa et al. | |
| 8,612,669 B1 | 12/2013 | Syu et al. | |
| 8,612,804 B1 | 12/2013 | Kang et al. | |
| 8,615,681 B2 | 12/2013 | Horn | |
| 8,638,602 B1 | 1/2014 | Horn | |
| 8,639,872 B1 | 1/2014 | Boyle et al. | |
| 8,683,113 B2 | 3/2014 | Abasto et al. | |
| 8,700,834 B2 | 4/2014 | Horn et al. | |
| 8,700,950 B1 | 4/2014 | Syu | |
| 8,700,951 B1 | 4/2014 | Call et al. | |
| 8,706,985 B1 | 4/2014 | Boyle et al. | |
| 8,707,104 B1 | 4/2014 | Jean | |
| 8,713,066 B1 | 4/2014 | Lo et al. | |
| 8,713,357 B1 | 4/2014 | Jean et al. | |
| 8,719,501 B2 | 5/2014 | Flynn et al. | |
| 8,719,531 B2 | 5/2014 | Strange et al. | |
| 8,724,422 B1 | 5/2014 | Agness et al. | |
| 8,725,931 B1 | 5/2014 | Kang | |
| 8,745,277 B2 | 6/2014 | Kan | |
| 8,751,728 B1 | 6/2014 | Syu et al. | |
| 8,769,190 B1 | 7/2014 | Syu et al. | |
| 8,769,232 B2 | 7/2014 | Suryabudi et al. | |
| 8,773,802 B1 | 7/2014 | Anderson et al. | |
| 8,775,720 B1 | 7/2014 | Meyer et al. | |
| 8,782,327 B1 | 7/2014 | Kang et al. | |
| 8,782,334 B1 | 7/2014 | Boyle et al. | |
| 8,788,778 B1 | 7/2014 | Boyle | |
| 8,788,779 B1 | 7/2014 | Horn | |
| 8,788,880 B1 | 7/2014 | Gosla et al. | |
| 8,793,429 B1 | 7/2014 | Call et al. | |
| 2002/0083264 A1 | 6/2002 | Coulson | |
| 2003/0140198 A1 | 7/2003 | Ninose et al. | |
| 2003/0145167 A1 | 7/2003 | Tomita | |
| 2005/0108473 A1 | 5/2005 | Le Moal et al. | |
| 2005/0120251 A1 | 6/2005 | Fukumori | |
| 2006/0075185 A1 * | 4/2006 | Azzarito et al. | 711/113 |
| 2006/0195657 A1 | 8/2006 | Tien et al. | |
| 2007/0006021 A1 | 1/2007 | Nicholson et al. | |
| 2007/0050540 A1 | 3/2007 | Klein | |
| 2007/0162693 A1 * | 7/2007 | Nam | 711/113 |
| 2008/0024899 A1 | 1/2008 | Chu et al. | |
| 2008/0040537 A1 | 2/2008 | Kim | |
| 2008/0049354 A1 | 2/2008 | Nitta | |
| 2008/0059694 A1 | 3/2008 | Lee | |
| 2008/0130156 A1 | 6/2008 | Chu et al. | |

(56) References Cited

U.S. PATENT DOCUMENTS

| | | |
|---|---|---|
| 2008/0177938 A1 | 7/2008 | Yu |
| 2008/0222353 A1 | 9/2008 | Nam et al. |
| 2008/0256287 A1 | 10/2008 | Lee et al. |
| 2008/0288714 A1 | 11/2008 | Salomon et al. |
| 2008/0307270 A1 | 12/2008 | Li |
| 2009/0019218 A1 | 1/2009 | Sinclair et al. |
| 2009/0024793 A1 | 1/2009 | Fontenot et al. |
| 2009/0031072 A1 | 1/2009 | Sartore |
| 2009/0089501 A1 | 4/2009 | Ahn et al. |
| 2009/0103203 A1 | 4/2009 | Yoshida |
| 2009/0106518 A1 | 4/2009 | Dow |
| 2009/0144501 A2 | 6/2009 | Yim et al. |
| 2009/0150599 A1 | 6/2009 | Bennett |
| 2009/0172249 A1 * | 7/2009 | Matthews ............... 711/103 |
| 2009/0172324 A1 | 7/2009 | Han et al. |
| 2009/0172499 A1 | 7/2009 | Olbrich et al. |
| 2009/0198940 A1 | 8/2009 | Ash et al. |
| 2009/0213486 A1 | 8/2009 | Takahashi |
| 2009/0249168 A1 | 10/2009 | Inoue |
| 2009/0271562 A1 | 10/2009 | Sinclair |
| 2009/0327603 A1 | 12/2009 | McKean et al. |
| 2010/0067138 A1 | 3/2010 | Ooi et al. |
| 2010/0088459 A1 | 4/2010 | Arya et al. |
| 2010/0122030 A1 | 5/2010 | Peters et al. |
| 2010/0169541 A1 | 7/2010 | Freikorn |
| 2010/0174849 A1 | 7/2010 | Walston et al. |
| 2010/0191922 A1 | 7/2010 | Dickey et al. |
| 2010/0195243 A1 | 8/2010 | Zhu et al. |
| 2010/0250793 A1 | 9/2010 | Syu |
| 2010/0325352 A1 | 12/2010 | Schuette et al. |
| 2011/0010490 A1 | 1/2011 | Kwon et al. |
| 2011/0099323 A1 | 4/2011 | Syu |
| 2011/0106804 A1 | 5/2011 | Keeler et al. |
| 2011/0283049 A1 | 11/2011 | Kang et al. |
| 2011/0283128 A1 | 11/2011 | Farhan et al. |
| 2012/0170435 A1 | 7/2012 | Trantham |
| 2012/0260020 A1 | 10/2012 | Suryabudi et al. |
| 2012/0278531 A1 | 11/2012 | Horn |
| 2012/0284460 A1 | 11/2012 | Guda |
| 2012/0290779 A1 | 11/2012 | Eleftheriou et al. |
| 2012/0317338 A1 | 12/2012 | Yi et al. |
| 2012/0324191 A1 | 12/2012 | Strange et al. |
| 2013/0024650 A1 | 1/2013 | Ambat et al. |
| 2013/0117520 A1 | 5/2013 | Ryu |
| 2013/0132638 A1 | 5/2013 | Horn et al. |
| 2013/0145106 A1 | 6/2013 | Kan |
| 2013/0173850 A1 | 7/2013 | Song |
| 2013/0290668 A1 | 10/2013 | Na |
| 2013/0290793 A1 | 10/2013 | Booth et al. |
| 2014/0059405 A1 | 2/2014 | Syu et al. |
| 2014/0101369 A1 | 4/2014 | Tomlin et al. |
| 2014/0115427 A1 | 4/2014 | Lu |
| 2014/0133220 A1 | 5/2014 | Danilak et al. |
| 2014/0136753 A1 | 5/2014 | Tomlin et al. |
| 2014/0149826 A1 | 5/2014 | Lu et al. |
| 2014/0157078 A1 | 6/2014 | Danilak et al. |
| 2014/0181432 A1 | 6/2014 | Horn |
| 2014/0223255 A1 | 8/2014 | Lu et al. |

OTHER PUBLICATIONS

Hannes Payer, Marco A.A. Sanvido, Zvonimir Z. Bandic, Christoph M. Kirsch, "Combo Drive: Optimizing Cost and Performance in a Heterogeneous Storage Device", http://csl.cse.psu.edu/wish2009_papers/Payer.pdf., Proceedings First Workshop on Integrating Solid-State Memory into the Storage Hierarchy, WISH 2009, Mar. 7, 2009, Washington DC, pp. 1-8.

Gokul Soundararajan, Vijayan Prabhakaran, Mahesh Balakrishan, Ted Wobber, "Extending SSD Lifetimes with Disk-Based Write Caches", http://research.microsoft.com/pubs/115352/hybrid.pdf, Feb. 2010, Fast 2010: 8th USENIX Conference on File and Storage Technologies, 14 pages.

Xiaojian Wu, A. L Narasimha Reddy, "Managing Storage Space in a Flash and Disk Hybrid Storage System", Int'l. Symposium on Modeling, Analysis & Simulation of Computer and Telecommunication Systems 2009 (MASCOTS '09), Sep. 21-23, 2009, pp. 1-4.

Tao Xie, Deepthi Madathil, "SAIL: Self-Adaptive File Reallocation on Hybrid Disk Arrays", The 15th Annual IEEE International Conference on High Performance Computing (HiPC 2008), Bangalore, India, Dec. 17-20, 2008, 12 pages.

Non-Volatile Memory Host Controller Interface revision 1.0 specification available for download at http://www.intel.com/standards/nvmhci/index.htm. Ratified on Apr. 14, 2008, 65 pages.

DongKyu Lee; Koh, K.; "PDC-NH: Popular data concentration on NAND flash and hard disk drive," 2009 10th IEEE/ACM International Conference on Grid Computing, pp. 196-200, Oct. 13-15, 2009.

* cited by examiner

DISK DRIVE STEERING WRITE DATA TO WRITE CACHE BASED ON WORKLOAD

BACKGROUND

Disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and servo sectors. The servo sectors comprise head positioning information (e.g., a track address) which is read by the head and processed by a servo control system to control the velocity of the actuator arm as it seeks from track to track.

The data sectors are accessed indirectly using logical block addresses (LBAs) mapped to physical block addresses (PBAs) representing the physical location of each data sector. This indirect accessing facilitates mapping out defective data sectors during manufacturing as well as while the disk drive is deployed in the field. Access commands (read/write) received from the host include LBAs which the disk drive maps to corresponding PBAs using any suitable mapping technique.

The LBA to PBA mapping may also facilitate a log structured file system wherein at least part of the disk is written as a circular buffer. For example, the circular buffer may be written from an outer diameter track toward an inner diameter track, and then circle back to the outer diameter track. Data is written to the head of the circular buffer such that the LBAs of new write commands are mapped to the PBAs of the corresponding data sectors. When the same LBA is written by the host, the data is written to a new PBA at the head of the circular buffer and the old PBA is marked invalid so that it may be overwritten. During a garbage collection operation, valid PBAs previously written in the circular buffer may be relocated to the head of the circular buffer so that the old PBAs may be overwritten.

DETAILED DESCRIPTION OF EMBODIMENTS OF THE INVENTION

Figure 1A:
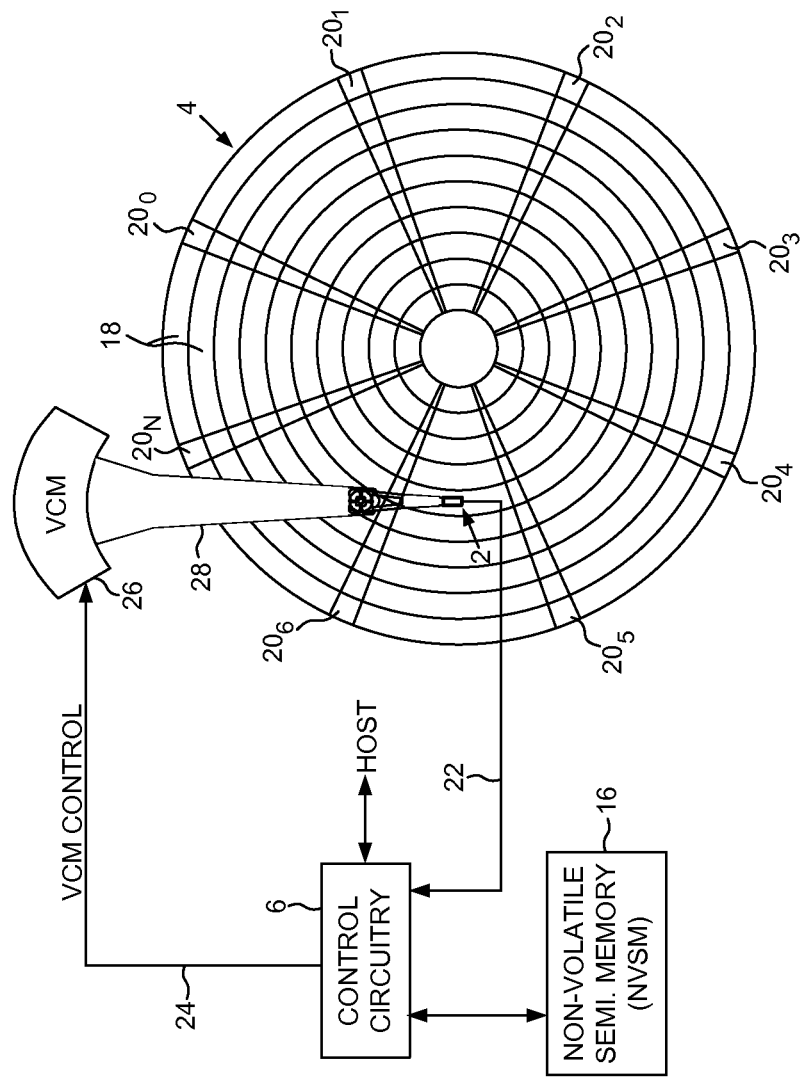
FIG. 1A shows a disk drive according to an embodiment of the present invention comprising a head actuated over a disk, and control circuitry including a non-volatile semiconductor memory for implementing a write cache.
Figure 1B:
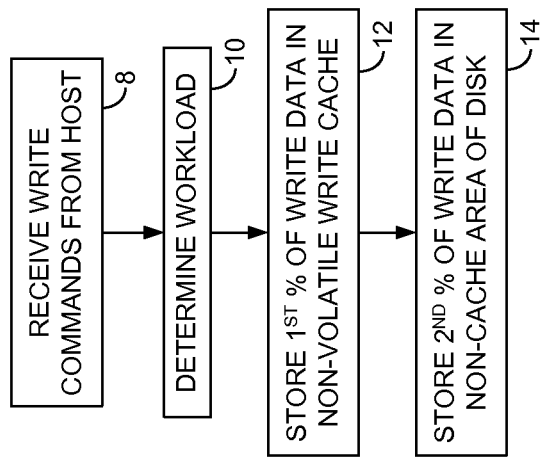
FIG. 1B is a flow diagram executed by the control circuitry for steering write data to the non-volatile write cache based on a workload of the disk drive according to an embodiment of the present invention.

FIG. 1A shows a disk drive according to an embodiment of the present invention comprising a head 2 actuated over a disk 4 and control circuitry 6 for executing the flow diagram of FIG. 1B. A plurality of write commands are received from a host (step 8), wherein each write command comprises write data. A workload for the disk drive is determined (step 10), wherein a first percentage of the write data is stored in a non-volatile write cache (step 12) and a second percentage of the write data in a non-cache area of the disk (step 14), wherein the first and second percentages are based on the workload.

In the embodiment of FIG. 1A, the non-volatile write cache is implemented within a non-volatile semiconductor memory (NVSM) 16, such as a flash memory. Since the NVSM 16 does not suffer from mechanical access latency as with the disk 4, the write data received from the host can typically be stored in the NVSM 16 much faster than it can be stored to the disk 4, particularly when the write commands are non-sequential. Accordingly, when the workload is high the NVSM 16 is used to cache write data received from the host so that the host write commands are not blocked while waiting to access the disk 4. When the workload decreases, the write commands can be redirected back to the disk 4, and when the disk drive is idle, the write data stored in the non-volatile write cache of the NVSM 16 may be flushed to the disk 4.

In one embodiment, the entire capacity of the NVSM 16 is allocated to the non-volatile write cache, and in another embodiment, only part of the NVSM 16 is allocated to the non-volatile write cache. In an embodiment disclosed in greater detail below, part of the NVSM 16 may be allocated for storing a certain percentage of logical block addresses (LBAs) assigned to the disk drive, and in one embodiment the number of LBAs allocated to the NVSM 16 may change over time based on a migration policy. Also in an embodiment described in greater detail below, the write data stored in the non-volatile write cache of the NVSM 16 is eventually flushed to the disk 4 during an idle mode of the disk drive. In one embodiment, the flushed write data may remain in the NVSM 16 so that it may be accessed from either the NVSM 16 and/or the disk 4 during read operations until the LBAs of the disk 4 are overwritten (thereby invalidating the LBAs stored in the non-volatile write cache of the NVSM 16). In another embodiment, the LBAs of the flushed write data in the NVSM 16 are erased to free the memory in the NVSM 16 for other use.

The disk 4 shown in the embodiment of FIG. 1A comprises a plurality of data tracks 18 defined by servo sectors $20_0$-$20_N$, wherein each data track comprises a plurality of data sectors accessed indirectly through an LBA. The control circuitry 6 processes a read signal 22 emanating from the head 2 to demodulate the servo sectors $20_0$-$20_N$ into a position error signal (PES) representing a position error of the head relative to a target data track. The control circuitry 6 comprises a servo compensator for filtering the PES to generate a control signal 24 applied to a voice coil motor (VCM) 26 that rotates an actuator arm 28 about a pivot in order to actuate the head 2 radially over the disk 4 in a direction that reduces the PES.

Figure 2:
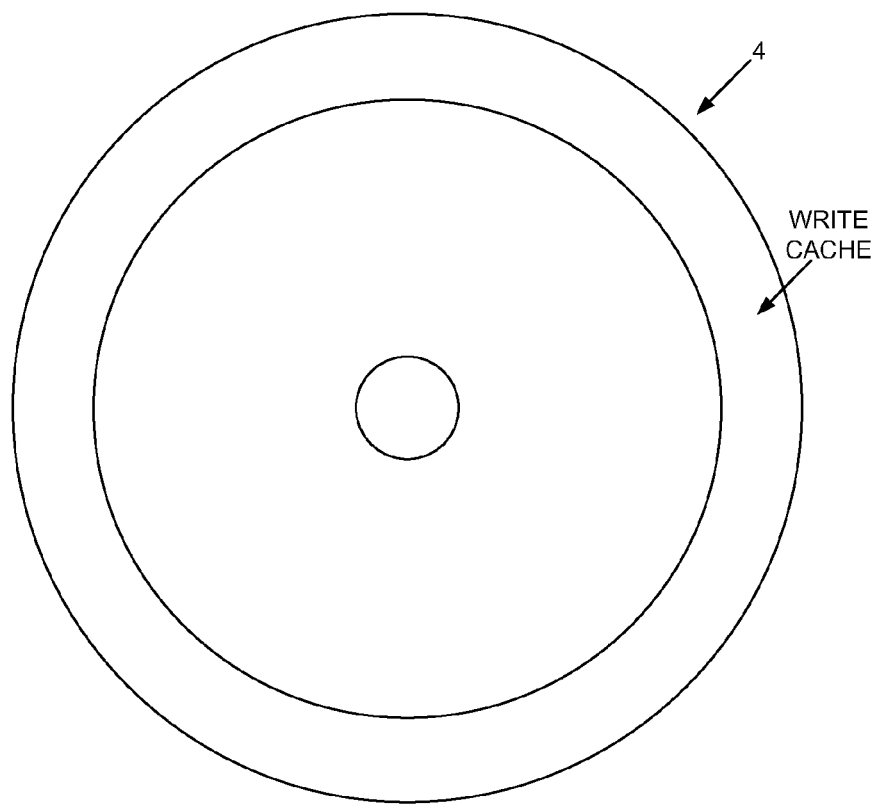
FIG. 2 shows an embodiment of the present invention wherein the non-volatile write cache is implemented as a plurality of tracks on the disk.

FIG. 2 shows an embodiment of the present invention wherein the non-volatile write cache may comprise a plurality of data tracks on the disk 4. In the example of FIG. 2, the plurality of data tracks for the write cache are located near an outer diameter of the disk where the data rate is fastest and therefore the throughput of the disk is fastest. In addition, in one embodiment the write cache on the disk 4 is implemented as a circular buffer so that the head 2 need not perform seeks in order to service multiple write commands from the host, thereby avoiding the mechanical latency that would otherwise limit the throughput of the write commands. Similar to the embodiment of FIG. 1A described above, during an idle mode of the disk drive the write data stored in the disk write cache may be flushed to a non-cache area of the disk allocated for "permanent" storage of the LBAs. After flushing the write data from the disk write cache, the corresponding LBAs of the write cache are marked as invalid so they may be overwritten, but may still be accessed during subsequent read commands until they are overwritten.

Figure 3:
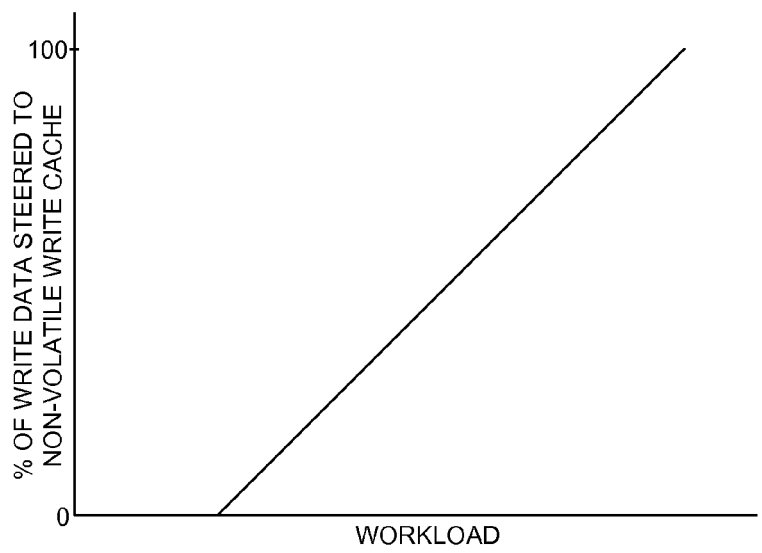
FIG. 3 shows an embodiment of the present invention wherein the percentage of write data written to the non-volatile write cache is based on a linear function of the workload.

FIG. 3 shows an example relationship of a percentage of write data steered to the non-volatile write cache as a linear function of the workload. In this embodiment, when the workload is below a threshold, all of the write data of the write commands received from the host is written to the disk (bypassing the non-volatile write cache). As the workload increases beyond a threshold, a percentage of the write data is steered to the non-volatile write cache until eventually all of the write data is steered to the non-volatile write cache. Although the example of FIG. 3 shows a linear relationship between the amount of write data steered to the non-volatile write cache and the workload, any suitable function may be employed, such as a suitable quadratic or exponential function.

In one embodiment, a migration algorithm may be employed to migrate LBAs of write commands to either the NVSM 16 of FIG. 1A or to the disk 4. For example, if a write/read frequency of an LBA exceeds a threshold, the LBA may be assigned to the disk 4 to mitigate write amplification of the NVSM 16. In other embodiments, the migration policy may assign randomly accessed LBAs to the NVSM 16 to avoid the mechanical latency of the disk 4 whereas sequentially accessed LBAs may be assigned to the disk 4. Accordingly, in one embodiment the percentage of write data steered to the non-volatile write cache (e.g., FIG. 3) corresponds only to the write data that would have otherwise been written to the disk 4. That is, the LBAs of the write data already assigned to the NVSM 16 may not impact the steering algorithm described above. In another embodiment, the amount of write data assigned to the NVSM 16 may impact the steering algorithm if the NVSM 16 is not able to sustain throughput of all the write data (to both the write cache area and non-cache area of the NVSM 16).

Figure 8A:
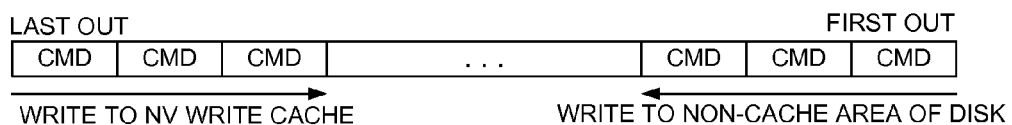
FIG. 8A shows an embodiment of the present invention wherein during high workloads the write commands steered to the non-volatile write cache are selected based on a rotational position optimization (RPO) algorithm.

In one embodiment of the present invention, a rotational position optimization (RPO) algorithm may be employed to select access commands for the disk. An RPO algorithm orders the access commands for the disk based on the radial location of the head so that the access commands are executed in an optimal order that minimizes the access latency. In one embodiment, when the workload exceeds the steering threshold (FIG. 3), the write commands steered to the non-volatile write cache are selected based on the RPO algorithm. For example, the write commands at the end of a disk command queue as ordered by the RPO algorithm may be selected as the write commands steered to the non-volatile write cache. This embodiment is illustrated in FIG. 8A which shows a disk command queue storing access commands in an order based on an RPO algorithm. When the workload exceeds the steering threshold, the write commands at the end of the disk command queue (last in the order) are steered to the non-volatile write cache whereas the write commands at the start of the disk command queue (first in order) are steered to the non-cache area of the disk until all of the write commands in the disk command queue have been processed (or until the workload falls below the steering threshold).

Figure 8B:
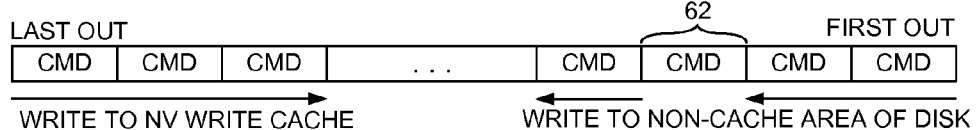
FIG. 8B shows an embodiment of the present invention wherein during high workloads write commands that are nearing a time-out limit waiting to be written to the non-cache area of the disk may be steered to the non-volatile write cache.

In one embodiment, the commands in the disk command queue have a time limit for execution. For example, a communication protocol with a host may specify a time limit for each command before the disk drive should return an error. Commands nearing the time-out limit are typically given higher priority in the RPO algorithm (or bypass the RPO algorithm altogether). FIG. 8B shows an embodiment of the present invention wherein a write command 62 nearing it's time-out limit waiting to be written to the non-cache area of the disk based on the RPO algorithm is instead written to the non-volatile write cache. That is, the write data steered to the non-volatile write cache during high workloads may be selected in response to a time-out limit of the write commands stored in the disk command queue.

Figure 4A:
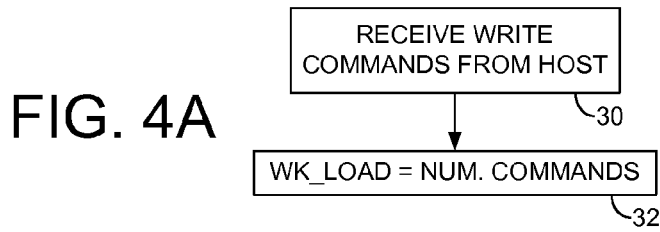
FIGS. 4A-4F show flow diagrams according to embodiments of the present invention for determining the workload of the disk drive.

The workload of the disk drive may be determined in any suitable manner in the embodiments of the present invention. FIG. 4A is a flow diagram according to an embodiment of the present invention wherein after receiving a number of write commands from the host (step 30), the workload may be determined based on the number of write commands pending (step 32). For example, as the number of write commands pending increases, there may be a corresponding increase in the determined workload.

Figure 4B:
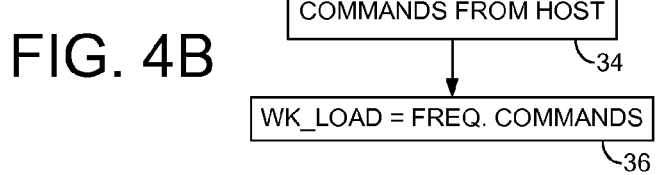

FIG. 4B is a flow diagram according to an embodiment of the present invention wherein as write commands are received from the host (step 34), the workload may be determined based on the frequency of write commands (step 36). For example, as a frequency of the write commands increases, there may be a corresponding increase in the determined workload.

Figure 4C:
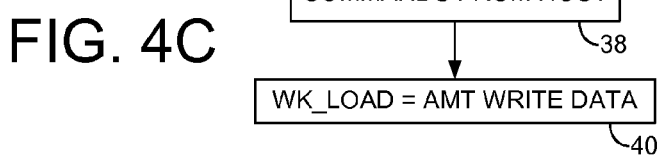

FIG. 4C is a flow diagram according to an embodiment of the present invention wherein after receiving a number of write commands from the host (step 38), the workload may be determined based on the amount of write data in the write commands (step 40). For example, as the amount of write data in the pending write commands increases, there may be a corresponding increase in the determined workload.

Figure 4D:
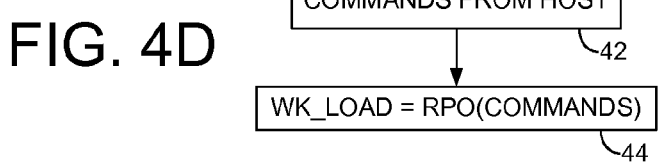

FIG. 4D is a flow diagram according to an embodiment of the present invention wherein after receiving a number of write commands from the host (step 42), the workload may be determined based on the RPO algorithm described above. For example, as the RPO algorithm computes a longer time to execute write commands in the command queue, there may be a corresponding increase in the determined workload.

Figure 4E:
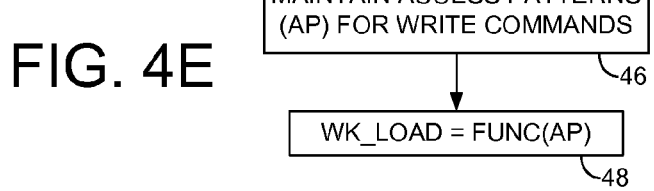

FIG. 4E is a flow diagram according to an embodiment of the present invention wherein a plurality of access patterns are maintained (step 46), wherein the workload may be determined based on a detected access pattern (step 48). For example, the control circuitry may identify access patterns of the host that correspond to a high workload. When the control circuitry determines that a high workload access pattern is likely being executed by the host, the control circuitry adjusts the workload parameter for steering the write data to the non-volatile write cache.

Figure 4F:
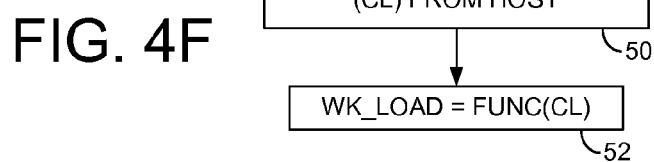

FIG. 4F is a flow diagram according to another embodiment of the present invention wherein a command load message is received from the host (step 50) and the workload is adjusted accordingly (step 52). For example, the host may be aware of when a high workload access pattern is about to be executed and send a corresponding command load message to the disk drive in order to configure the workload parameter for steering the write data to the non-volatile write cache.

Figure 5:
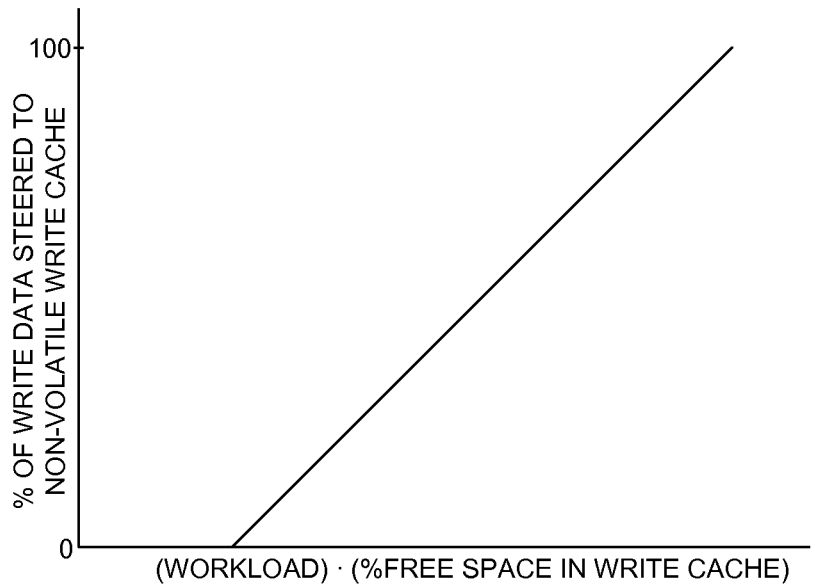
FIG. 5 shows an embodiment of the present invention wherein the percentage of write data written to the non-volatile write cache is based on the workload of the disk drive and a percentage of free space in the non-volatile write cache.

FIG. 5 shows an embodiment of the present invention wherein the percentage of write data steered to the non-volatile write cache is based on the workload and a percentage of free space in the non-volatile write cache. As write data is stored in the non-volatile write cache leaving less free space, the amount of write data steered to the write cache is reduced so that the performance of the disk drive does not change suddenly when the write cache is full. In one embodiment, a quadratic or exponential function of the free space may be employed since the amount of free space is more significant at smaller percentages (i.e., as the write data approaches the capacity of the write cache).

Figure 6:
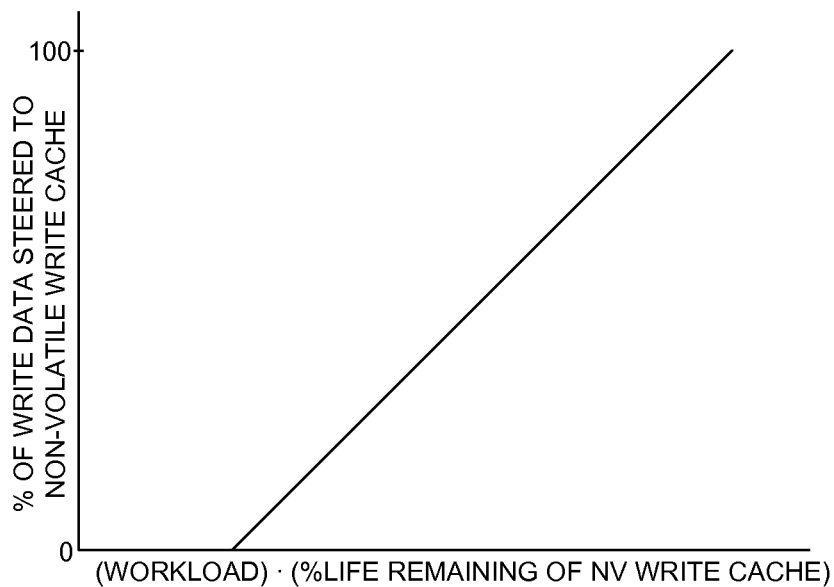
FIG. 6 shows an embodiment of the present invention wherein the percentage of write data written to the non-volatile write cache is based on the workload of the disk drive and a percentage of life remaining of the non-volatile write cache.

FIG. 6 shows an embodiment of the present invention wherein the percentage of write data steered to the non-volatile write cache is based on the workload and a percentage of life remaining in a NVSM 16 (FIG. 1A) that stores the write cache. The number of program/erase cycles is typically limited for the NVSM 16, and therefore in one embodiment the life remaining for the NVSM 16 is based on the number of program/erase cycles remaining. As the NVSM 16 approaches end of life (maximum number of program/erase cycles), the amount of data steered to the write cache is reduced so that the performance of the disk drive does not change suddenly when the NVSM 16 reaches end of life. In one embodiment, a quadratic or exponential function of the life percentage may be employed so that the performance of the disk drive does not change significantly until the NVSM 16 nears end of life.

Figure 7:
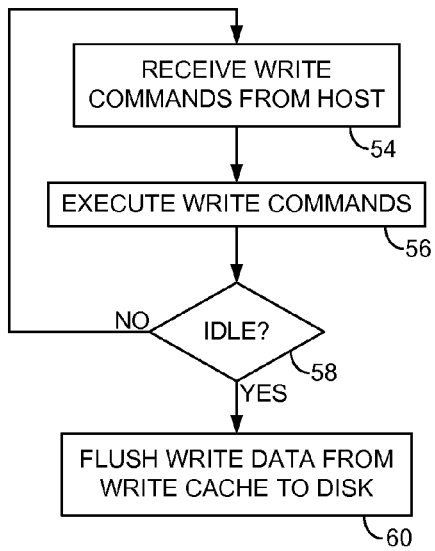
FIG. 7 is a flow diagram according to an embodiment of the present invention wherein during an idle mode the write data is flushed from the non-volatile write cache to the disk.

FIG. 7 is a flow diagram according to an embodiment of the present invention wherein as write commands are received from the host (step 54), they are executed based on the workload by storing the write data either in the non-volatile write cache or on the disk (step 56). When the disk drive enters an idle mode (step 58), the write data stored in the non-volatile write cache is flushed to a non-cache area of the disk (step 60). In one embodiment, the write data may remain in the non-volatile write cache until it becomes invalid due to an over-write operation. In this manner, the write data can be accessed from either the non-volatile write cache and/or the non-cache area of the disk during subsequent read operations. In another embodiment, after flushing the write data from the non-volatile write cache the corresponding portion of the write cache is invalidated (and in one embodiment erased) so that it may be re-used.

Any suitable control circuitry may be employed to implement the flow diagrams in the embodiments of the present invention, such as any suitable integrated circuit or circuits. For example, the control circuitry may be implemented within a read channel integrated circuit, or in a component separate from the read channel, such as a disk controller, or certain steps described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into a SOC.

In one embodiment, the control circuitry comprises a microprocessor executing instructions, the instructions being operable to cause the microprocessor to perform the steps of the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

What is claimed is:

1. A disk drive comprising:
   a non-volatile write cache;
   a disk;
   a head actuated over the disk; and
   control circuitry operable to:
   receive a plurality of write commands from a host, wherein each write command comprises write data;
   determine a workload for a non-cache area of the disk independent of a sequentiality of the write commands;
   when the workload for the non-cache area of the disk is less than a threshold independent of a workload for the write cache, store substantially all of the write data in the non-cache area of the disk; and
   when the workload for the non-cache area of the disk is greater than the threshold independent of the workload for the write cache, store a first percentage of the write data in the non-volatile write cache and a second percentage of the write data in the non-cache area of the disk, wherein the first percentage is proportional to the workload for the non-cache area of the disk.

2. The disk drive as recited in claim 1, wherein the non-volatile write cache comprises a non-volatile semiconductor memory.

3. The disk drive as recited in claim 1, wherein the non-volatile write cache comprises part of the disk.

4. The disk drive as recited in claim 1, wherein the control circuitry is further operable to:
   store the plurality of write commands in a command queue; and
   determine the workload for the non-cache area of the disk based on a number of commands stored in the command queue.

5. The disk drive as recited in claim 1, wherein the control circuitry is further operable to determine the workload based on a frequency of the write commands received from the host.

6. The disk drive as recited in claim 1, wherein the control circuitry is further operable to:
   store the plurality of write commands in a disk command queue; and
   determine the workload based on a rotational position optimization (RPO) algorithm for selecting the write commands from the disk command queue based at least on a radial location of the head.

7. The disk drive as recited in claim 1, wherein the control circuitry is further operable to:
   maintain a plurality of access patterns of the write commands received from the host; and
   determine the workload based on the access patterns.

8. The disk drive as recited in claim 1, wherein the control circuitry is further operable to:
   receive a command load message from the host; and
   determine the workload based on the command load message.

9. The disk drive as recited in claim 1, wherein the first and second percentages are further based on an amount of free space in the non-volatile write cache.

10. The disk drive as recited in claim 1, wherein the first and second percentages are further based on a percentage of life remaining for the non-volatile write cache.

11. The disk drive as recited in claim 1, wherein the control circuitry is further operable to flush the write data from the non-volatile write cache to the non-cache area of the disk during an idle mode.

12. The disk drive as recited in claim 1, wherein the control circuitry is further operable to:
    execute the write commands based on a rotational position optimization (RPO) algorithm for the disk; and
    select the write data to be stored in the non-volatile write cache in response to the RPO algorithm.

13. The disk drive as recited in claim 1, wherein the control circuitry is further operable to select the write data to be stored in the non-volatile write cache in response to a time-out limit assigned to each write command.

14. A method of operating a disk drive, the disk drive comprising a head actuated over a disk and a non-volatile write cache, the method comprising:
    receiving a plurality of write commands from a host, wherein each write command comprises write data;
    determining a workload for a non-cache area of the disk independent of a sequentiality of the write commands;
    when the workload for the non-cache area of the disk is less than a threshold independent of a workload for the write cache, store substantially all of the write data in the non-cache area of the disk; and
    when the workload for the non-cache area of the disk is greater than the threshold independent of the workload for the write cache, storing a first percentage of the write data in the non-volatile write cache and a second percentage of the write data in the non-cache area of the disk, wherein the first percentage is proportional to the workload for the non-cache area of the disk.

15. The method as recited in claim 14, wherein the non-volatile write cache comprises a non-volatile semiconductor memory.

16. The method as recited in claim 14, wherein the non-volatile write cache comprises part of the disk.

17. The method as recited in claim 14, further comprising:
    storing the plurality of write commands in a command queue; and
    determining the workload for the non-cache area of the disk based on a number of commands stored in the command queue.

18. The method as recited in claim 14, further comprising determining the workload based on a frequency of the write commands received from the host.

19. The method as recited in claim 14, further comprising:
    storing the plurality of write commands in a disk command queue; and
    determining the workload based on a rotational position optimization (RPO) algorithm for selecting the write commands from the disk command queue based at least on a radial location of the head.

20. The method as recited in claim 14, further comprising:
    maintaining a plurality of access patterns of the write commands received from the host; and
    determining the workload based on the access patterns.

21. The method as recited in claim 14, further comprising:
    receiving a command load message from the host; and
    determining the workload based on the command load message.

22. The method as recited in claim 14, wherein the first and second percentages are further based on an amount of free space in the non-volatile write cache.

23. The method as recited in claim 14, wherein the first and second percentages are further based on a percentage of life remaining for the non-volatile write cache.

24. The method as recited in claim 14, further comprising flushing the write data from the non-volatile write cache to the non-cache area of the disk during an idle mode.

25. The method as recited in claim 14, further comprising:
    executing the write commands based on a rotational position optimization (RPO) algorithm for the disk; and
    selecting the write data to be stored in the non-volatile write cache in response to the RPO algorithm.

26. The method as recited in claim 14, further comprising selecting the write data to be stored in the non-volatile write cache in response to a time-out limit assigned to each write command.

* * * * *